C. S. HURTT.
TROLLING DEVICE.
APPLICATION FILED JULY 26, 1920.

1,400,821.

Patented Dec. 20, 1921.
2 SHEETS—SHEET 1.

INVENTOR
CHRISTOPHER S. HURTT
By Edward C. Birkenbuel
ATTORNEY.

UNITED STATES PATENT OFFICE.

CHRISTOPHER S. HURTT, OF PORTLAND, OREGON.

TROLLING DEVICE.

1,400,821.  Specification of Letters Patent.  Patented Dec. 20, 1921.

Application filed July 26, 1920. Serial No. 398,858.

*To all whom it may concern:*

Be it hereby known that I, CHRISTOPHER S. HURTT, a citizen of the United States, and resident of Portland, in the county of Multnomah and State of Oregon, have invented a new and useful Trolling Device, of which the following is a specification.

This invention relates more particularly to that branch of the fishing art known as trolling.

The object of my invention is to provide an exceedingly simple, efficient and inexpensive means for trolling from a fishing boat, and to eliminate as far as possible the tiresome operation of hauling in lines by hand, and to reduce as far as possible the opportunities for a fish to escape after it has once caught upon the hook.

I am aware that various devices for accomplishing this purpose have been constructed, but these have been found objectionable owing to the excessive first cost, weight and space occupied on the fishing boat.

I accomplish the results which I claim to attain by the means described in the following specification and illustrated in the accompanying drawings, in which:—

Figure 2:
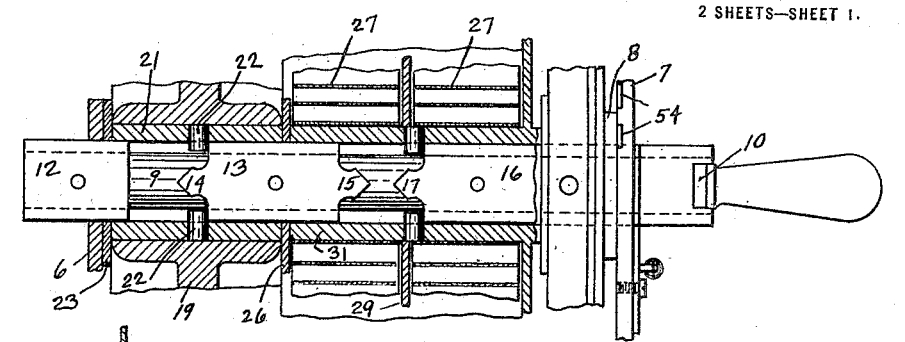
Figure 1:
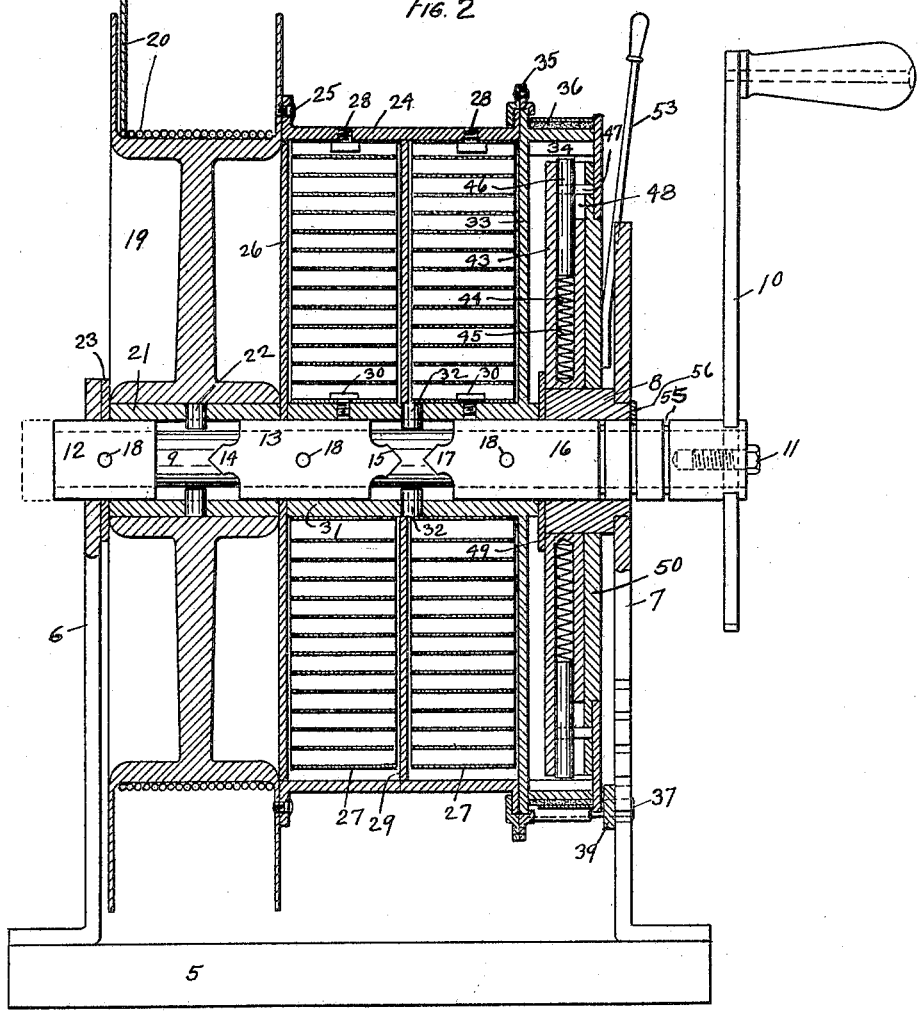
Figure 3:
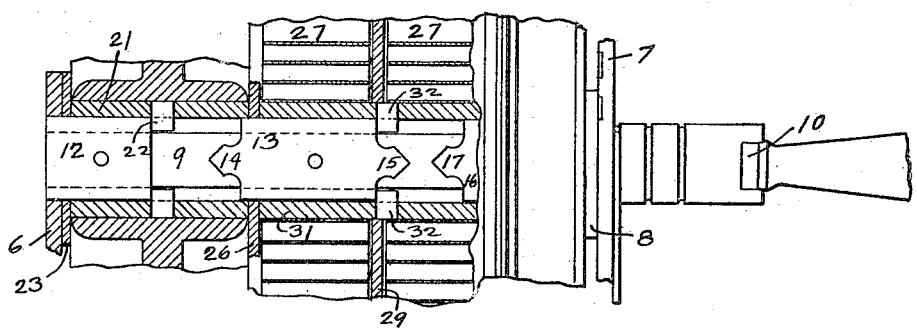
Figure 4:
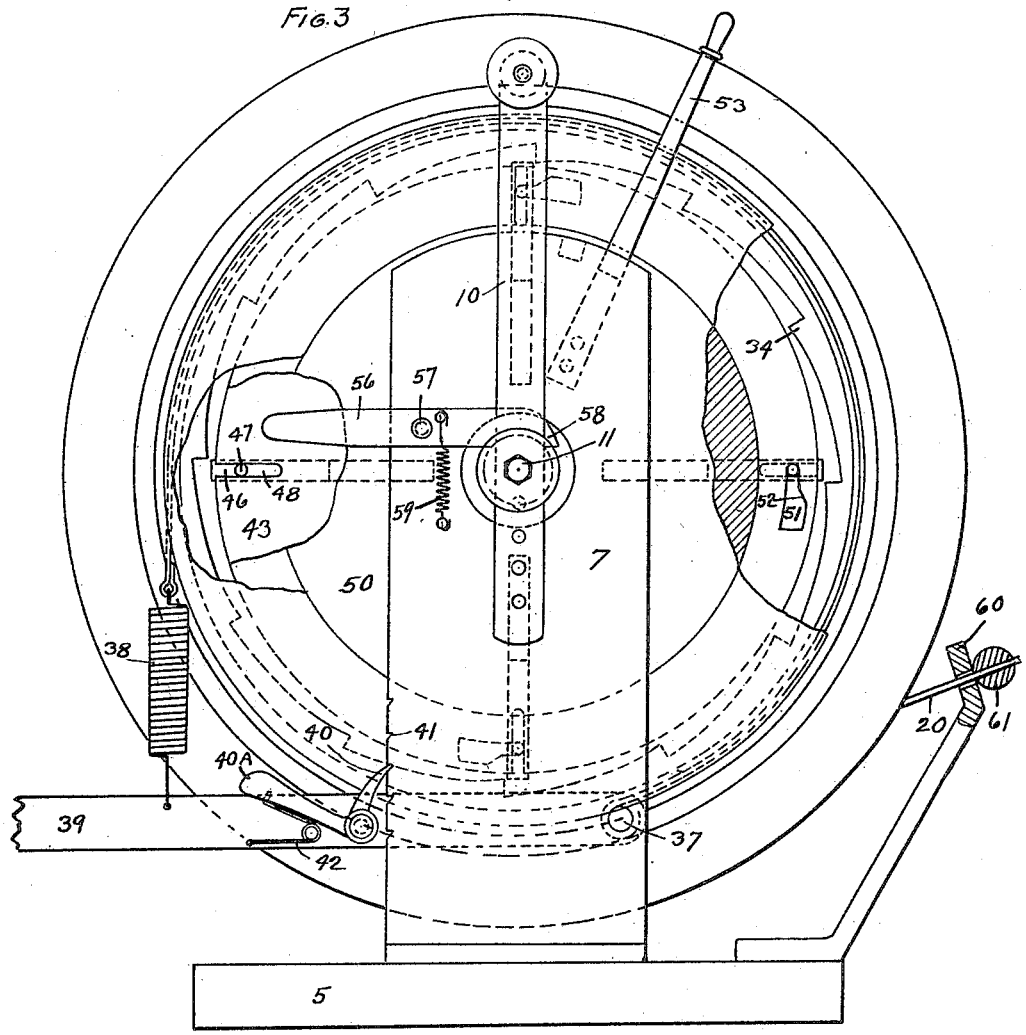

Figure 1 is a longitudinal section through the device showing the parts in a neutral or playing-out position. Fig. 2 is a partial sectional view showing the parts in the "in" position. Fig. 3 is similar to Fig. 2 but showing the parts in the "out" position. Fig. 4 is an end elevation of the device with portions cut away for clearness.

Similar numbers of reference refer to the same or similar parts throughout the several views.

Referring in detail to the drawings, I have constructed my device upon a base 5 on one end of which I have erected a standard 6 and on the other end a similar standard 7 into which is pressed a hub 8. Through the standard 6 and the hub 8 I have passed a built-up axis consisting of a central shaft 9, on one end of which I have secured the adjustable crank 10 which is held in place by means of the bolt 11. On the opposite end of the shaft 9 I have secured a sleeve 12. Near the center of the shaft 9 I have secured a second sleeve 13 at one end of which I have formed the projecting lugs 14 and the other end of which I have formed the projecting lugs 15. A third sleeve 16 is secured to the crank end of the shaft 9 and has formed on same a pair of projecting lugs 17. The sleeves 12, 13 and 16 are secured to the shaft 9 by means of the rivets 18. All of the sleeves are slidably mounted in the standard 6 and the hub 8.

On the sleeves 12 and 13 I have mounted a reel 19 of sufficient size to carry the trolling line 20 which may be guided as seen fit to meet the various requirements and conditions to prevent fouling of the line. Within the reel 19 I have secured the bushing 21 which rides on the sleeves 12 and 13. On the diameter and at the center of the inside of this bushing I have projected the two fixed lugs 22 which clear the shaft 9 between the sleeves 12 and 13. A washer 23 is placed between the hub of the reel 19 and the standard 6.

On the crank side of the reel 19 I have attached the barrel 24 by means of the screws 25. Inside of this barrel against the reel 19 and extending to the sleeve 13 I have placed the spring retaining disk 26. Within the barrel 24 I have secured the two coil springs 27 by means of the screws 28 and separated these springs by means of the disk 29. These springs are attached by means of the screws 30 to the arbor 31 which bears on the sleeves 13 and 16. On the inside of the arbor 31 I have provided a pair of lugs 32 similar to the lugs 22 but lying between the sleeves 13 and 16.

On the crank end of the arbor 31 I have constructed a combined brake and ratchet wheel 33 having the braking surface on its exterior periphery and ratchet teeth 34 on its interior. A split guard member 35 seals the union between the barrel 24 and the member 33.

A brake band 36 partially surrounds the braking surface of the member 33. One end of this band is attached to a stud 37 on the standard 7 and the other end is joined by means of a suitable tension spring 38 to a brake lever 39 which also hinges on the stud 37. A pawl 40 is mounted on the side of the brake lever 39 and is arranged to engage suitable notches 41 formed on the edge of the standard 7, the spring 42 holding same into engagement. A handle 40ᴬ on the pawl 40 renders the disengagement of the pawl and the notches 41 a simple matter.

Secured on the hub 8 is the circular plate 43 on whose quarters are drilled the radial holes 44 in which are inserted the compression springs 45 upon which are forced the plungers 46. A pin 47 projects from the side of each of the plungers 46 and is arranged to slide in the slot 48 and projects somewhat beyond the lateral face of the circular plate 43. A washer 49 is placed on the sleeve 16 between the arbor 31 and the hub 8. It will be understood that the circular plate 43 is stationary.

On the outside of the circular plate 43 and on the hub 8 I have rotatably placed a plunger controlling disk 50 in whose surface are cut four openings 51 adapted to receive the projecting end of the pins 47. Each of the openings 51 is provided with an inclined surface 52 which is adapted to cause the pin 47 to force the plunger 46 against the spring 45 and disengage the plunger 46 from the ratchet teeth 34. A lever 53 is secured to the member 50 and held in one or the other of two positions by the notches 54 formed in the inside of the upper end of the standard 7.

It will be seen that the crank 10 and the shaft upon which it is mounted may slide into any one of three positions. In order to insure their remaining in any desired position I have provided the three annular grooves 55 around the sleeve 16 near the crank 10. On the inside of the standard 7 I have provided the latch 56 on the stud 57 in a manner that its swinging end 58 may ride in one of the grooves 55 and be held therein by the spring 59. This spring, it will be observed, is attached in such a manner that any excessive depression of the handle end of the latch 56 will cause it to be held out of engagement with the grooves 55 by the spring 59 on account of same pulling on the opposite side of the pivot formed by the stud 57.

I have mounted a bracket 60 on the base 5 and perforated its upper end with a hole sufficiently large to receive the trolling line 20 near whose outer end is attached the sinker 61 which, being unable to pass through the hole in the bracket 60, serves as a stop for the line.

The operation of my device is as follows: The device having been suitably mounted in the boat forward of the fish box the running end of the line 20 is thrown overboard with the crank 10 in the position shown in Fig. 2. It will be seen that the spring 27 and the reel 19 are both locked to the shaft 9. This position is used when the line becomes snagged while playing out, or when the tackle is out of use, in which latter event the plungers 46 are brought into engagement with the ratchet teeth 34 by means of the lever 53. This prevents the line from being unwound by any movement of the boat.

When the crank 10 is in the neutral position, as shown in Fig. 1, the apparatus is in condition for playing out the line by throwing same over-board and utilizing the drag on the line to rotate the reel 19. By applying the desired pressure on the lever 39 a uniform braking effect will be exerted on the parts which will cause a uniform tension to be maintained on the springs 27. A greater drag developing on the line will cause the brake to act as a friction clutch and make same unwind. When desiring to release this accumulated spring tension after taking off a fish preparatory to again playing out the line it is only necessary to permit the stop 61 to rest against the member 60 and then release the pressure on the brake band by disengaging the latch 40.

In Fig. 3, which I term the "out" position, the parts are illustrated in the position in which they are used when trolling without strikes and for winding in strikes. In this case it will be seen that the motion supplied to the crank 10 is delivered through the shaft 9 and the lugs 15 through the springs 27 to the reel 19. It will be understood that the operation of the lever 53 into either of its two positions in which it engages the notches 54 tends to rotate the plunger controlling disk 50 and either hold the plungers 46 away from the ratchet teeth 34 or permit same to engage the teeth under the pressure of the spring 45.

It will be appreciated by anyone familiar with the art of trolling that during the operation of hauling in a strike the fisherman needs to operate only the crank 10. Whatever shifting is necessary in the mechanism to meet the various conditions which are very likely to arise is done after a fish is landed.

I am aware that there are numerous ways in which this end can be attained, for instance, instead of the ratchet mechanism illustrated I could employ a simple pawl, but I have selected this construction on account of its peculiar adaptability to this type of machine. Other types of selective mechanism for determining the union between the various elements may also be employed without departing from the spirit of my invention.

While I have thus illustrated and described my device it is not my intention to limit myself to this precise form or method of application, but intend that it shall cover all forms and modifications that fall fairly within the appended claims.

What I claim as new and desire to protect by Letters Patent of the United States, is:—

1. In a trolling device, the combination of a frame means, a shaft slidable into an in position, a neutral position and an out position on said frame, a fishing reel mounted on said shaft and having a means for rotatably engaging same in the in position only, a spiral spring mounted on said shaft, a sleeve on said shaft within said spring adapted to rotatably engage said shaft in either its in or out position, and a barrel containing said spring and forming a part of said reel.

2. In a trolling device, the combination of a frame means, a shaft slidable into an in position, a neutral position and an out position on said frame, a fishing reel mounted on said shaft and having a means for rotatably engaging same in the in position only, a spiral spring mounted on said shaft, a sleeve on said shaft within said spring adapted to rotatably engage said shaft in either its in or out position, a barrel containing said spring and forming a part of said reel, and a brake means applicable to the sleeve within said spring.

3. In a trolling device, the combination of a frame means, a shaft slidable into an in position, a neutral position and an out position on said frame, a fishing reel mounted on said shaft and having a means for rotatably engaging same in the in position only, a spiral spring mounted on said shaft, a sleeve on said shaft within said spring adapted to rotatably engage said shaft in either its in or out position, a barrel containing said spring and forming a part of said reel, and a ratchet means arranged to permit rotation of the spring sleeve in one direction, and lock same to said frame in the other direction.

4. In a trolling device, the combination of a frame means, a shaft slidable into an in position, a neutral position and an out position on said frame, a fishing reel mounted on said shaft and having a means for rotatably engaging same in the in position only, a spiral spring mounted on said shaft, a sleeve on said shaft within said spring adapted to rotatably engage said shaft in either its in or out position, a barrel containing said spring and forming a part of said reel, a brake means applicable to the sleeve within said spring, and a ratchet means arranged to permit rotation of the spring sleeve in one direction and lock same to said frame in the other direction.

5. A selective winding mechanism consisting of a slidable central shaft member, a plurality of sleeves secured on said shaft, clutch teeth projecting from ends of the individual sleeves, grooves in one of said sleeves, a pawl arranged to engage one of said sleeves and position said shaft, rotatable members mounted on said shaft and having internally projecting lugs adapted to engage the teeth on said sleeves in a selective manner, and a crank means for rotating said shaft.

6. In a trolling device, the combination of a frame member, a slidable shaft mounted on said frame member, a wide groove formed around same near one end of said shaft, said groove having clutch teeth formed on one side, a reel member slidably mounted on said shaft above said groove and having internally projecting pins adapted to engage said clutch teeth, a barrel secured on the side of said reel, a coil spring mounted within said barrel and attached to said reel, a sleeve attached within said spring above a second groove near the center of said slidable shaft, said last mentioned groove having opposed clutch teeth adapted to engage projecting pins within said sleeve when said shaft is in either extreme position, and a crank means for rotating and sliding said shaft.

7. In a trolling device, the combination of a machine of the character described with a ratchet stop mechanism consisting of ratchet teeth formed within the brake wheel of said machine, a stationary circular plate within said wheel having slidable radial plungers forced outwardly by spring means, a pin projecting laterally from each plunger through a slot in the side of said circular plate, and a rotatable plunger controlling disk mounted along side of said plate, said disk having cam surfaces for actuating all of said plungers in a manner to hold same away from the ratchet teeth by rotating said controlling disk in one direction or permitting their engagement.

8. In a trolling device, the combination of a frame member with a slidable selective shaft means, a reel mounted on said shaft arranged to drive same when the shaft is in its innermost position, a spring member attached to said reel and arranged to be driven by said shaft when it is in either the innermost or the outermost position, neither reel nor spring being driven by said shaft when in the neutral position, and adjustable ratchet stop mechanism attached to said spring, a brake means for exerting a friction on said ratchet mechanism, a sinker stop means rising from the base of the device through which the trolling line is threaded, and a means for locking said slidable shaft in any of its three positions.

CHRISTOPHER S. HURTT.